United States Patent [19]
Liu

[11] Patent Number: 6,066,411
[45] Date of Patent: May 23, 2000

[54] COVER DEVICE FOR A STORAGE BATTERY

[75] Inventor: Chien-Chen Liu, Tainan, Taiwan

[73] Assignee: B.B. Battery Co., Ltd., Tainan, Taiwan

[21] Appl. No.: 09/150,494

[22] Filed: Sep. 9, 1998

[51] Int. Cl.⁷ .................................................. H01M 2/12
[52] U.S. Cl. .............................. 429/82; 429/84; 429/175; 429/88
[58] Field of Search .................................. 429/87, 84, 82, 429/89, 175

[56] References Cited

U.S. PATENT DOCUMENTS 3,360,403  12/1967  Halsall .
3,647,556   3/1972  Cox .
5,702,841  12/1997  Thomas et al. .

*Primary Examiner*—John S. Maples
*Attorney, Agent, or Firm*—Sheridan Ross P.C.

[57] ABSTRACT

A cover device is adapted for use with a casing which has an open top end, and a confining wall which confines an interior that is divided into a plurality of cell compartments by partition plates. The cover device includes a lower cover body with a top wall and a surrounding wall which confines a cavity that is divided into a plurality of chambers by means of dividers. Each of the dividers has a bottom edge that is adapted to be mounted sealingly on a top edge of a respective one of the partition plates to prevent fluid communication among the cell compartments below the top wall. The top wall has a vent area that is formed with a plurality of vent holes for communicating an upper side of the top wall with the chambers, respectively, and a plurality of upwardly projecting annular lips around the vent holes, respectively. Each of the annular lips is formed with a notch unit, and has a pressure cap sleeved movably thereon for covering the respective vent hole. The upper cover plate is mounted on the vent area on the top side of the top wall at a spaced-apart relationship with the caps.

2 Claims, 6 Drawing Sheets

COVER DEVICE FOR A STORAGE BATTERY

BACKGROUND OF THE INVENTION

1. Field of the Invention

This invention relates to a cover device for use with a casing to form a battery housing for a storage battery, more particularly to a cover device which prevents electrolyte received in each of the cell compartments of the casing from flowing into the adjacent cell compartments when the battery housing is accidentally toppled over.

2. Description of the Related Art

Referring to FIG. 1, a conventional battery housing for a storage battery generally includes a hollow casing 1, and a cover device 2 mounted on the casing 1. The casing 1 opens upwardly, and confines a rectangular interior 11 which is divided by a number of partition plates 12 into a plurality of cell compartments 13 for receiving electrolyte and plate electrodes. As shown in FIGS. 1 and 2, the cover device 2 includes a lower cover body 20 which has a top wall and a surrounding wall that extends downwardly from the periphery of the top wall and that confines a cavity 21. The cavity 21 is also divided into a plurality of chambers 23 aligned respectively with the cell compartments 13 by means of a number of dividers 22 that are aligned respectively with the partition plates 12. Each of the dividers 22 has a bottom edge which is in contact with a top edge of a respective one of the partition plates 12 and which is formed with a notch 24. The top wall is further formed with a pair of openings 26 to permit extension of electrical wires therethrough. The openings 26 are sealed after installing the electrical wires.

The top wall of the lower cover body 20 is divided into an electrolyte pouring area 25 and a vent area 26. The electrolyte pouring area 25 is provided with a plurality of electrolyte pouring tubes 251 which extend into the chambers 23, respectively. The vent area 26 is provided with a vent tube 262 that confines a vent hole communicated with one of the chambers 23. The vent tube 262 has a top edge formed with a pair of notches 263. A pressure cap 264 is mounted movably on the vent tube 262 for covering the vent hole and the notches 263. Vapor that is generated in the cell compartments 13 during use of the storage battery flows through the notches 24 and into the vent hole to push the pressure cap 264 upwardly so as to expose the notches 263 for venting the vapor from the cell compartments 13. An upper cover plate 27 is sealed to the vent area 26 on the top side of the top wall of the lower cover body 20, and confines a space with the vent area 26. The top wall of the lower cover body 20 is further formed with a pair of slits 261 communicated with the space. As such, the vapor which is vented from the cell compartments 13 via the vent hole and the notches 263 can escape from the cover device 2 via the slits 261.

The above-described cover device 2 provides a sealing effect to prevent leakage of the electrolyte from the battery housing, and permits venting of the vapor generated during use of the storage battery. However, since only one vent hole is provided in the cover device 2, the venting effect achieved thereby is insufficient. In addition, when the battery housing is accidentally toppled over, the electrolyte received in each of the cell compartments 13 is likely to flow through the notches 24, as shown in FIG. 3, to result in uneven distribution of the electrolyte among the cell compartments 13, thereby adversely affecting the performance of the storage battery.

SUMMARY OF THE INVENTION

The object of the present invention is to provide a cover device which prevents electrolyte received in each of the cell compartments of the casing from flowing into the other cell compartments when the battery housing is accidentally toppled over and which provides an enhanced venting effect.

Accordingly, the cover device of the present invention is adapted for use with a casing to form a battery housing. The casing has an open top end, and a confining wall that confines an interior which is divided by a plurality of partition plates into a plurality of cell compartments. Each of the partition plates has a top edge. The cover device of the present invention includes a lower cover body, a plurality of pressure caps, and an upper cover plate. The lower cover body has a top wall and a surrounding wall which extends downwardly from a periphery of the top wall and which is adapted to be mounted sealingly on the confining wall of the casing. The surrounding wall confines a cavity. The lower cover body further has a plurality of dividers for dividing the cavity into a plurality of chambers adapted to be registered with the cell compartments of the casing, respectively. Each of the dividers has a bottom edge adapted to be mounted sealingly on the top edge of a respective one of the partition plates of the casing in order to prevent fluid communication among the cell compartments of the casing below the top wall. The top wall is divided into an electrolyte pouring area and a vent area. The electrolyte pouring area is formed with a plurality of electrolyte pouring units that extend into the chambers, respectively, to permit pouring of an electrolyte into the cell compartments, respectively. The vent area is formed with a plurality of vent holes for communicating an upper side of the top wall with the chambers, respectively, and a plurality of annular lips formed on the upper side around the vent holes, respectively. Each of the annular lips is formed with a notch unit. The pressure caps are sleeved movably on the annular lips for covering the vent holes, respectively. Each of the pressure caps is movable upwardly to permit venting of vapor from the respective cell compartment via the notch unit on the respective one of the annular lips. The upper cover plate is mounted on the vent area on the top side of the top wall at a spaced-apart relationship with the caps.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
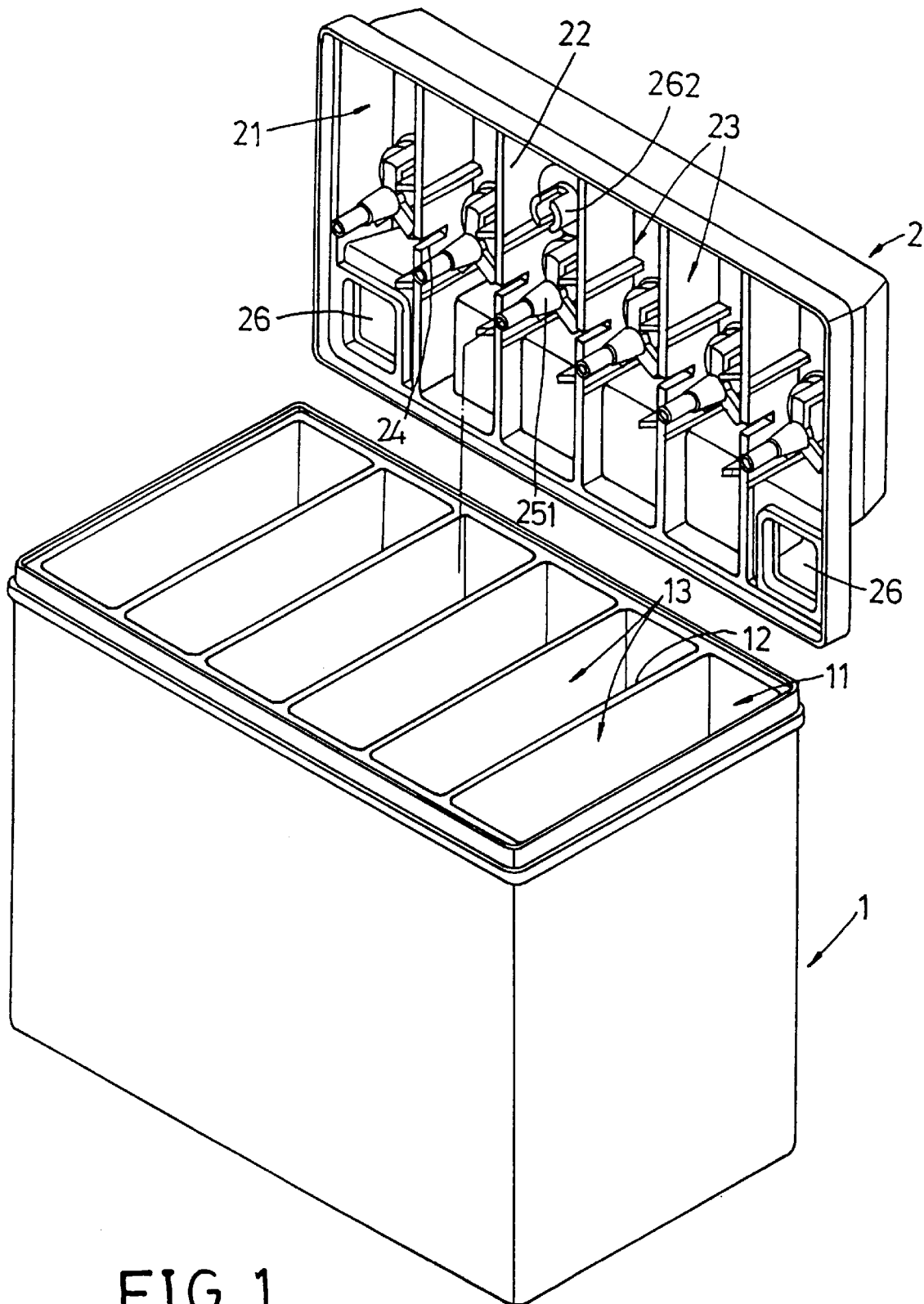
FIG. 1 is a perspective view of a conventional battery housing.
Figure 2:
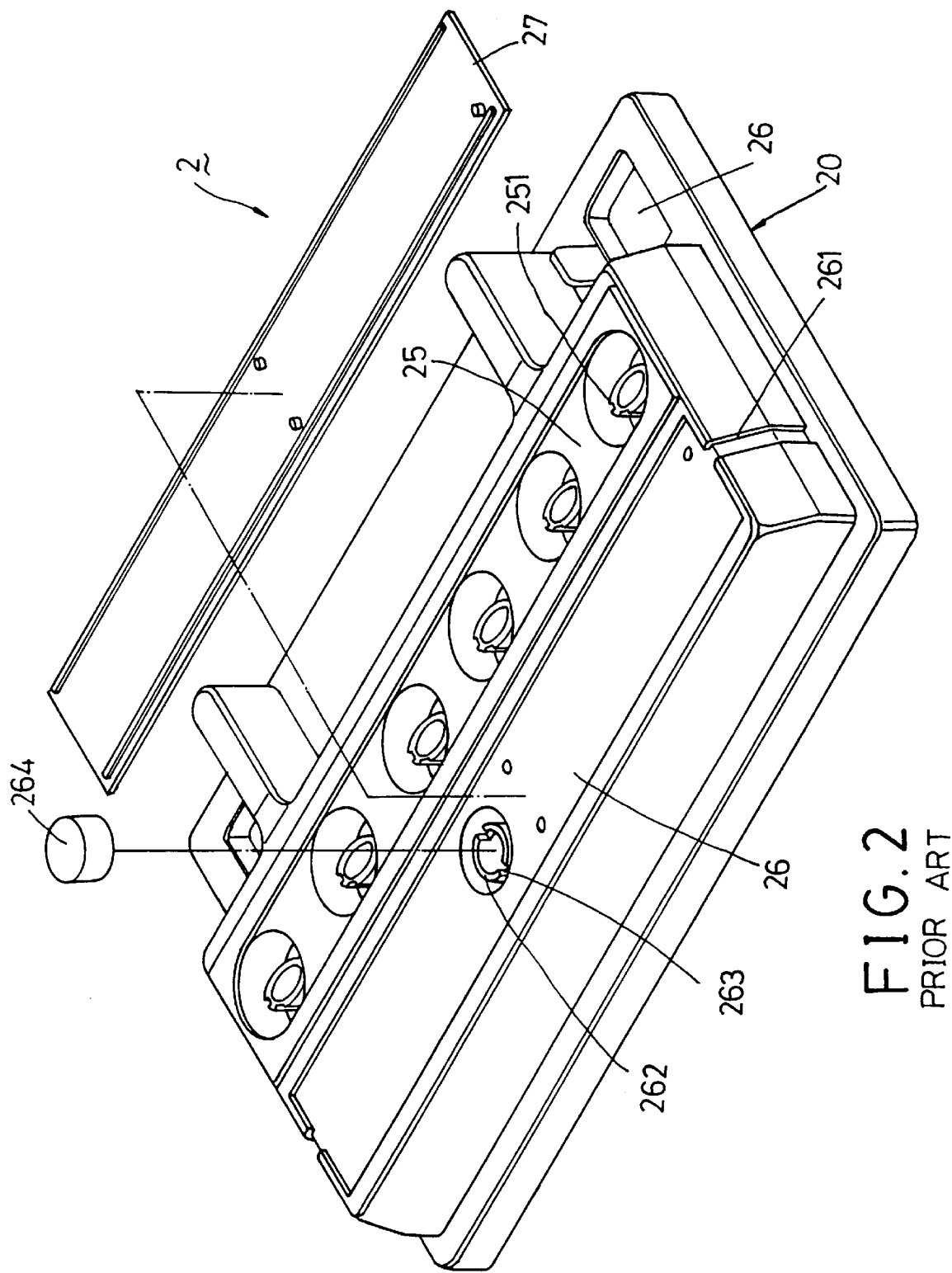
FIG. 2 is an exploded perspective view of a cover device of the conventional battery housing.
Figure 3:
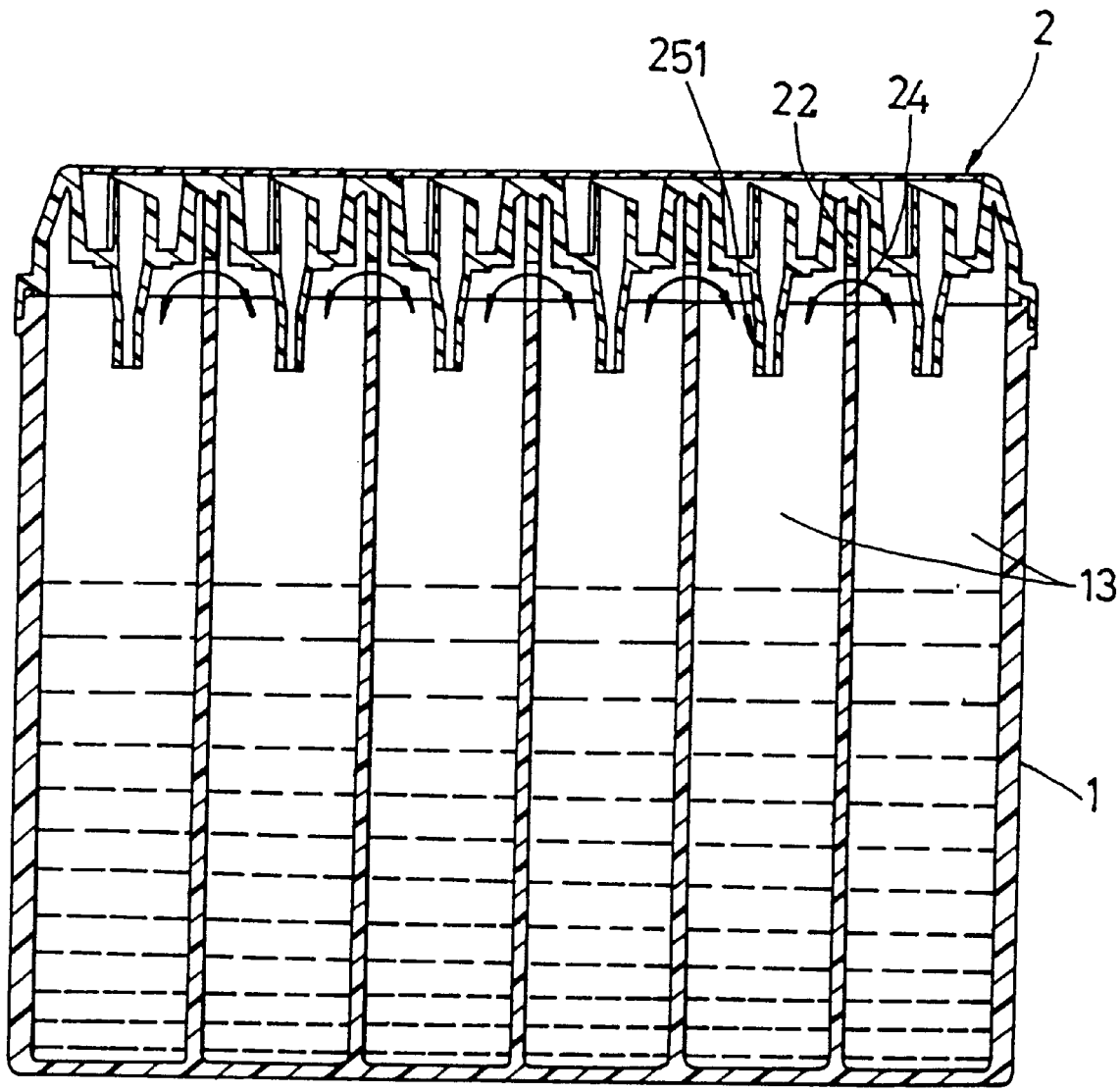
FIG. 3 is a vertical sectional view of the conventional battery housing.
Figure 4:
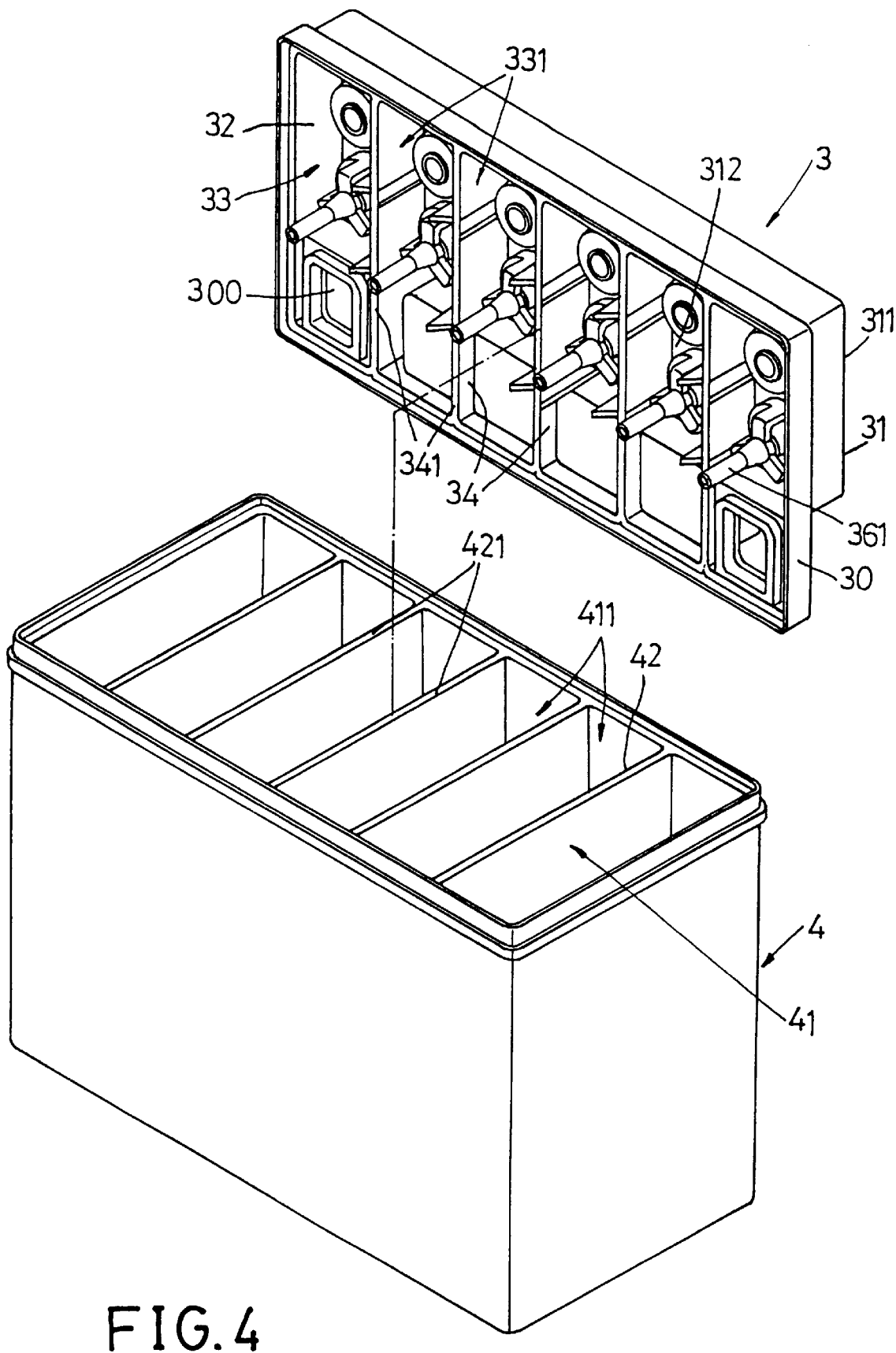
FIG. 4 is a perspective view of a battery housing incorporating the preferred embodiment of a cover device according to the present invention.

Referring to FIG. 4, the cover device 3 of the preferred embodiment according to the present invention is adapted for use with a casing 4 to form a battery housing for a storage battery.

The casing 4 is formed as a generally rectangular hollow body with an open top end and a confining wall that confines an interior 41 which is divided by a plurality of partition plates 42 into a plurality of cell compartments 411. Each of the partition plates 42 has a top edge 421.

Figure 5:
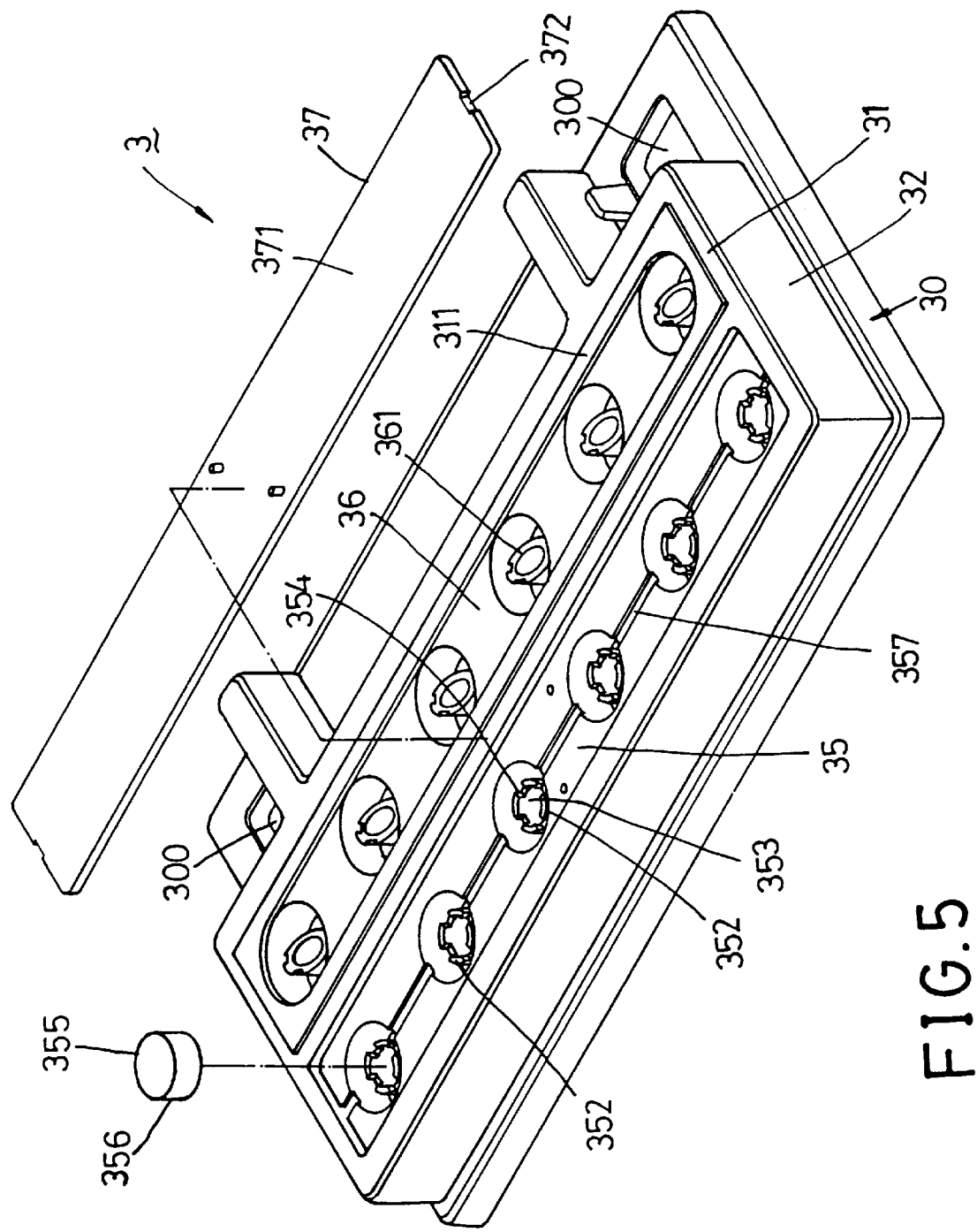
FIG. 5 is an exploded perspective view of the cover device of the preferred embodiment.

Referring to FIGS. 4 and 5, the cover device 3 of the preferred embodiment is shown to include a lower cover body 30, a plurality of pressure caps 355 (only one is shown in FIG. 5), and an upper cover plate 37.

The lower cover body 30 has a top wall 31 with an upper side 311 and a lower side 312, and a surrounding wall 32 which extends downwardly from a periphery of the top wall 31 and which confines a cavity 33 adapted to confront the interior 41 of the casing 4. The lower cover body 30 further has a plurality of dividers 34 which are formed on the lower side 312 of the top wall 31 and which are adapted to be aligned with the partition plates 42, respectively, to divide the cavity 33 into a plurality of chambers 331 adapted to be aligned with the cell compartments 411, respectively. Each of the dividers 34 has a bottom edge 341 adapted to be mounted sealingly on the top edge 421 of a respective one of the partition plates 42 of the casing 4. Thus, a plurality of fluidly isolated spaces can be formed below the top wall 31 when the cover device 3 is mounted on the casing 4.

The top wall 31 of the lower cover body 30 is divided into a vent area 35 which has an indented upper side, and an electrolyte pouring area 36. The electrolyte pouring area 36 is formed with a plurality of electrolyte pouring tubes 361 which extend into the chambers 331, respectively, to permit pouring of an electrolyte into a respective one of the cell compartments 411. Each of the electrolyte pouring tubes 361 is provided with a cap (not shown) for capping and sealing the same after pouring of an electrolyte into the respective cell compartment 411. The vent area 35 is formed with a plurality of vent holes 353 through the upper and lower sides 311, 312 of the top wall 31 for communicating the upper side 311 with the chambers 331, respectively. A plurality of slits 357 are formed on the upper side 311 of the top wall 31, each being disposed between adjacent ones of the vent holes 353. The vent area 35 is further formed with a plurality of annular lips 352 on the upper side 311 around the vent holes 353, respectively. Each of the annular lips 352 has a top edge formed with a notch unit 354 which includes four notches arranged in a cross-shape.

As with the aforementioned conventional cover device, the lower cover body 30 is formed with two openings 300 to permit installing of electrical wires. The openings 300 are sealed after installing the electrical wires.

Each of the pressure caps 355 is made of a resilient material, and is sleeved movably on a respective one of the annular lips 352 for covering the respective vent hole 353. Each of the pressure caps 355 has an annular flange portion 356 that extends downwardly for covering the notch unit 354 formed on the respective one of the annular lips 352.

Figure 6:
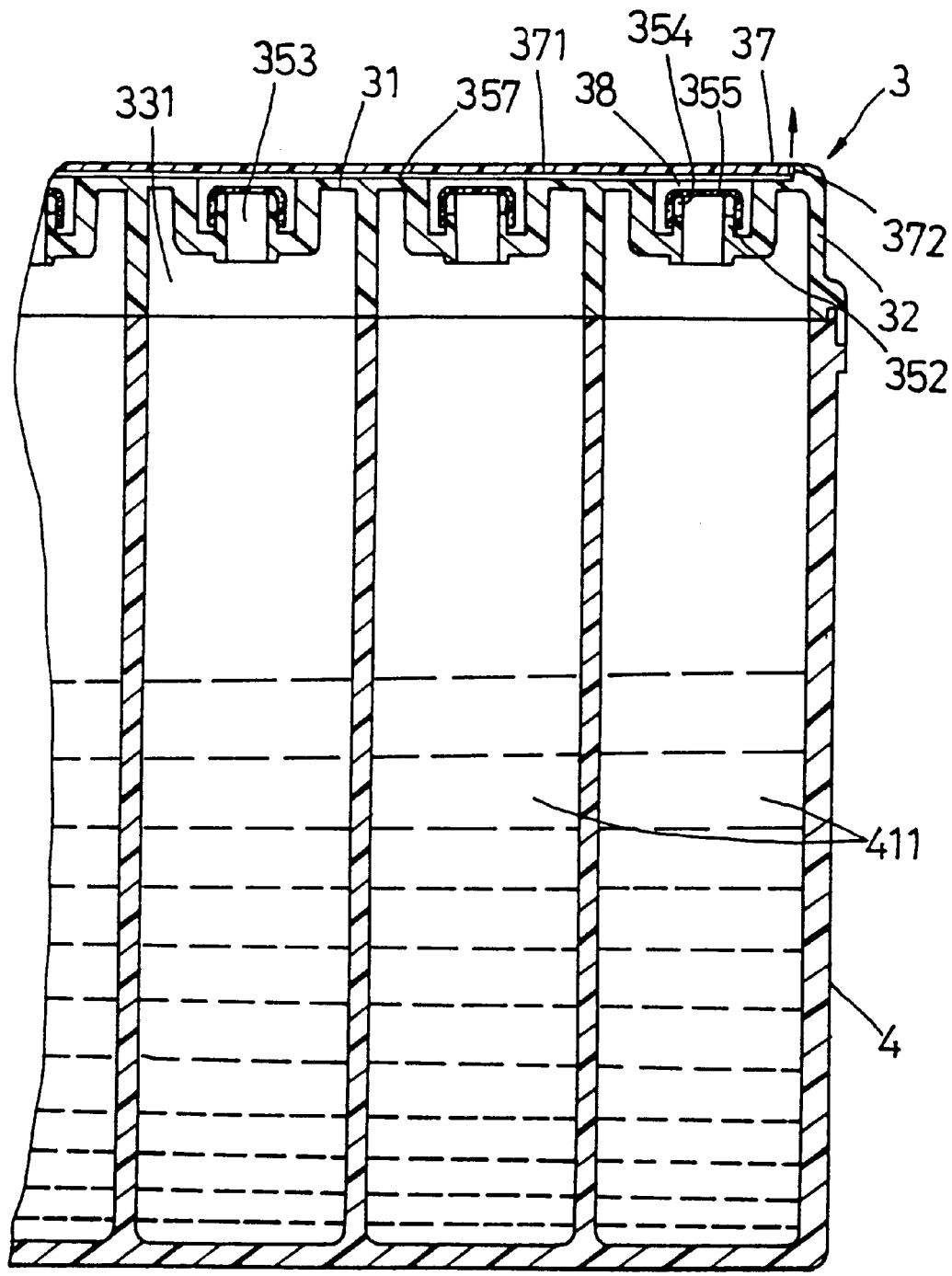
FIG. 6 is a fragmentary vertical sectional view of the cover device of the preferred embodiment.

Referring to FIGS. 5 and 6, the upper cover plate 37 has a size substantially corresponding to the vent area 35, and is mounted on the vent area 35 on the upper side 311 of the top wall 31 to cover the vent area 35. The upper cover plate 37 has a bottom side 371 which forms a space 38 with the pressure caps 355. The upper cover plate 37 has two opposite ends, each of which is formed with an opening 372 to permit escape of the vapor that is vented from the cell compartments 411 via the notch unit 354 on the respective one of the annular lips 352.

When the cover device 3 of the preferred embodiment is mounted on the casing 4 to form a battery housing, fluid communication among the cell compartments 411 below the top wall 31 of the lower cover body 30 is prevented. During use of the storage battery, each of the pressure caps 355 can be moved upwardly toward the upper cover plate 37 by vapor that is generated in the respective one of the cell compartments 411 to expose the notch unit 354 on the respective one of the annular lips 352, thereby permitting venting of the vapor from the respective cell compartment 411 via the respective notch unit 354. The vapor is then guided by the slits 357 for escape from the cover device 3 via the openings 372 formed in the upper cover plate 37.

It has thus been shown that the lower cover body 30 of the cover device 3 of the preferred embodiment has a plurality of vent holes 353 which are communicated with the chambers 331, respectively, to permit venting of vapor from the cell compartments 411, respectively. The venting effect achieved thereby is thus enhanced when compared with the prior art.

In addition, since fluid communication among the cell compartments 411 below the top wall 31 of the lower cover body 30 is prevented, the electrolyte received in each of the cell compartments 411 can be prevented from flowing out of the respective cell compartment 411 and into adjacent ones of the cell compartments 411 when the battery housing is accidentally toppled over.

With this invention thus explained, it is apparent that numerous modifications and variations can be made without departing from the scope and spirit of this invention. It is therefore intended that this invention be limited only as indicated in the appended claims.

I claim:

1. A cover device adapted for use with a casing to form a battery housing, the casing having an open top end, and a confining wall that confines an interior which is divided by a plurality of partition plates into a plurality of cell compartments, each of the partition plates having a top edge, said cover device comprising:

a lower cover body which has a top wall and a surrounding wall which extends downwardly from a periphery of said top wall and which is adapted to be mounted sealingly on the confining wall of the casing, said surrounding wall confining a cavity, said lower cover body further having a plurality of dividers for dividing said cavity into a plurality of chambers adapted to be registered with the cell compartments of the casing, respectively, each of said dividers having a bottom edge adapted to be mounted sealingly on the top edge of a respective one of the partition plates of the casing in order to prevent fluid communication among the cell compartments of the casing below said top wall, said top wall being divided into an electrolyte pouring area and a vent area, said electrolyte pouring area being formed with a plurality of electrolyte pouring units that extend into said chambers, respectively, to permit pouring of an electrolyte into said cell compartments, respectively, said vent area being formed with a plurality of vent holes for communicating an upper side of said top wall with said chambers, respectively, and a plurality of annular lips formed on said upper side around said vent holes, respectively, each of said annular lips being formed with a notch unit;

a plurality of pressure caps sleeved movably on said annular lips for covering said vent holes, respectively, each of said pressure caps being movable upwardly to permit venting of vapor from the respective cell compartment via said notch unit on the respective one of said annular lips; and an upper cover plate mounted on said vent area on a top side of said top wall at a spaced-apart relationship with said caps.

2. The cover device according to claim 1, wherein said upper cover plate is formed with at least one opening to permit escape of the vapor that is vented from the cell compartments via said notch unit on the respective one of said annular lips.

* * * * *